(12) United States Patent
Varnau

(10) Patent No.: US 6,220,608 B1
(45) Date of Patent: Apr. 24, 2001

(54) 4-JAW SELF-CENTERING CHUCKING SYSTEM

(75) Inventor: Bernard T. Varnau, Cincinnati, OH (US)

(73) Assignee: American Workholding, Inc., Cincinnati, OH (US)

( * ) Notice: Subject to any disclaimer, the term of this patent is extended or adjusted under 35 U.S.C. 154(b) by 0 days.

(21) Appl. No.: 09/197,287

(22) Filed: Nov. 20, 1998

Related U.S. Application Data

(60) Provisional application No. 60/066,223, filed on Nov. 20, 1997.

(51) Int. Cl.[7] .................................................. B23B 31/163
(52) U.S. Cl. ............................ 279/114; 279/115; 279/132
(58) Field of Search ........................... 279/114–116, 132, 279/137, 110; 269/152

(56) References Cited

U.S. PATENT DOCUMENTS

| 1,442,107 | * | 1/1923 | Vernaz | 279/114 |
|---|---|---|---|---|
| 1,713,802 | * | 5/1929 | Whiton | 279/114 |
| 1,727,535 | * | 9/1929 | Conradson | 279/116 |
| 2,457,030 | * | 12/1948 | Bugatti | 279/116 |
| 5,158,487 | * | 10/1992 | Varnau | 409/219 |

* cited by examiner

Primary Examiner—Steven C. Bishop
(74) Attorney, Agent, or Firm—Frost Brown Todd LLC

(57) ABSTRACT

The present invention is directed to a chucking system. The body of the chucking system preferably houses cam plates which may be driven manually by an independent worm shaft, or hydraulically by a piston/gear rack in lieu of a worm shaft. A face plate preferably houses four master jaws. The jaws may be engaged to the cam plates by pins. The jaws may be moved inward and outward preferably by rotation of the cam plates due to the ascending/descending slope of the slots in the cam plates. Each set of two jaws may be driven independently of the other because of the two separate cam plate mechanisms. The top cam plate is preferably held concentrically to the bottom cam plate by a needle bearing. The entire cam plate may "sandwich" pivot on a center tube which may be anchored in the base of the body and the top face plate.

3 Claims, 2 Drawing Sheets

4-JAW SELF-CENTERING CHUCKING SYSTEM

This application claims the benefit of U.S. provisional application Ser. No. 60/066,223, filed Nov. 20, 1997.

BACKGROUND AND SUMMARY OF THE INVENTION

The present invention relates generally to a chucking system that may be used on machine tools in general to hold parts to be machined.

In addition to the novel features and advantages mentioned herein, other objects and advantages of the present invention will be readily apparent from the following descriptions of the drawings and preferred embodiments.

DETAILED DESCRIPTION OF PREFERRED EMBODIMENT(S)

Figure 1:
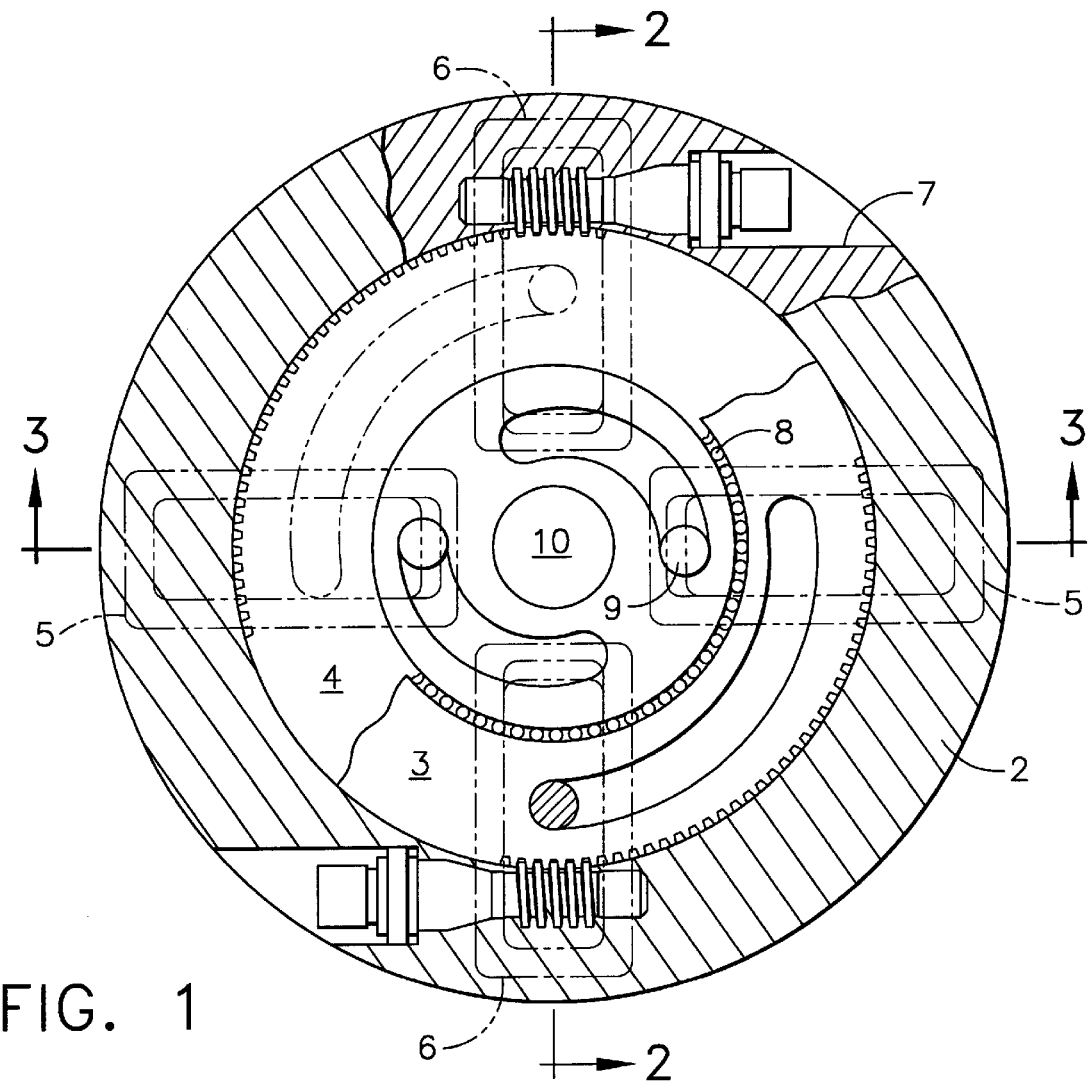
FIG. 1 is a top view of an embodiment of a chucking system constructed according to the present invention.

The present invention is directed to a chucking system that may be used on machine tools in general to hold parts to be machined. The present invention is directed to an indexible fixture for securing parts that are to be machined. This invention relates to a fixture for use in machining applications, and more particularly to a positioning fixture block having moveable jaws for use with machining centers.

In a preferred embodiment, each fixture is supplied with a plurality of complete sets of movable jaws which are built to hold close tolerances for years of accurate service. Three sets of jaws are secured to each of four side walls of the fixture. Of course, the number of jaw sets may vary depending on the user's needs. Either hard or soft work jaws may be used. The work jaws may be arranged to sit in a standard ninety degree serrated face master jaw which enables different jaws to be incorporated that are available from most jaw manufacturers. The fixture features welded steel or cast construction and may be designed to permit through-the-cube chucking of shafts. The use of soft jaws enables the user to custom machine the jaw locating faces to his own needs right on the machining center. Downtime is further reduced by using the fixture of the present invention on each pallet of a machining center so that idle pallets can be setup while another pallet is running.

Referring now to the drawings, there is illustrated a positioning fixture that may be used with a horizontal machining center. Various parts which are to be machined are secured to the fixture then the fixture may be moved along an axis until it reaches the cutting tool. The machining center may be automated to enable a tool to be automatically exchanged for other tools. The fixture may be secured to a base. The base is secured to an indexing member which may rotate to expose each face of the fixture to the cutting tool.

The fixture may include a casing having four side walls. The fixture may then be secured to a base member which will be used to secure the fixture on the machining center. Along each face plate one or more sets of jaws may be provided for gripping parts to be machined. Through holes at the center of each set of jaws provide clearance for shaft type parts.

In one embodiment the jaws may be actuated by the operator through tool insert holes. One tool insert hole may be provided for each set of jaws. The actuation for the jaws will be described more thoroughly hereinafter. Lastly, eye bolts may be secured to the top portion of the fixture to assist in the lifting of the fixture on to the machine center.

Each set of jaws may be comprised of two or more master jaws. Positioned within the slots of the master jaws may be two or more T-nuts. Work jaws may be positioned on the serrated face of the master jaws and secured by bolts passing through the work jaw and down into the T-nuts. The T-nuts may be adapted to slide inside the slot so that the work jaw may be arranged on the master jaw in various distances from the through hole or center.

Before further describing the present invention, it is important to note that many variations of the invention may be incorporated. For example, more or less than two sets of jaws may be in place on each face plate. Secondly, the fixture block does not necessarily have to be a cube shape. Each set of jaws may include more than two master jaws. The side walls may be one block of machined steel or welded plates assembled.

To actuate the master jaws a worm drive passageway may be provided which houses a worm gear. As a tool is inserted into the tool insert and engages the worm drive gear the worm drive gear will turn within the passageway. The worm drive gear may make contact with a worm track on a worm wheel. The worm wheel may be connected to a scroll plate by dowel pins through dowel pin holes in the scroll plate and worm wheel.

Bolts passing through bolt holes in the scroll plate and the worm wheel will tightly secure the two together. Therefore, as the worm wheel turns, the scroll plate will turn with it.

The scroll plate may have three somewhat elliptical shaped slots formed in a side thereof. The exact number and shape of the slots may vary and still fall within the scope of this invention. In one preferred embodiment there is an equal number of slots to go with jaws. Each slot may begin at one end, a particular distance from the perimeter of the scroll plate. The slots may descend toward the center of the scroll plate in such a manner that another end of the slots is a further distance away from the perimeter. In a preferred embodiment, the difference between the distances from one end to the perimeter, and the other end and the perimeter, may be one quarter inch. Of course, this difference may be more or less than one quarter inch depending on how much jaw movement is preferred.

Inside each slot may be a roller bushing and one end of a pin which may be made of hardened steel. As the scroll plate turns, the pins and roller bushings will move within the slots. While one end of the pins resides in the slots of the scroll plate, the other end of the pins may be secured within a portion of the master jaws. As the scroll plate turns, the scroll pin will move in or out, with respect to the center of the through hole, depending upon the direction of rotation of the scroll plate. As the pin moves in or out with respect to the through hole, the pin will force the master jaw to move within a slot of the face plate. The work jaw may be secured to the master jaw and as the scroll plate is turned by the worm wheel the work jaws will either tighten around the part to be machined or the work jaws will loosen from the part so that it may be removed from the fixture.

The work jaws are commercially available from many sources known to those of ordinary skill in the art. In one embodiment described above, the master jaws are actuated manually by a tool to turn the worm gear drive. In another embodiment, the jaws may also be actuated by electrical or hydraulic means.

In another embodiment for the fixture of the present invention a hydraulic system works generally as described above except for the manner in which the scroll plate is turned. Instead of having a worm wheel, a spur gear may be secured to the scroll plate. And, instead of a worm gear a rack drive gear may be provided inside a hollowed out section of the side wall. Hydraulic fluid under pressure is used to actuate the components.

Figure 2:
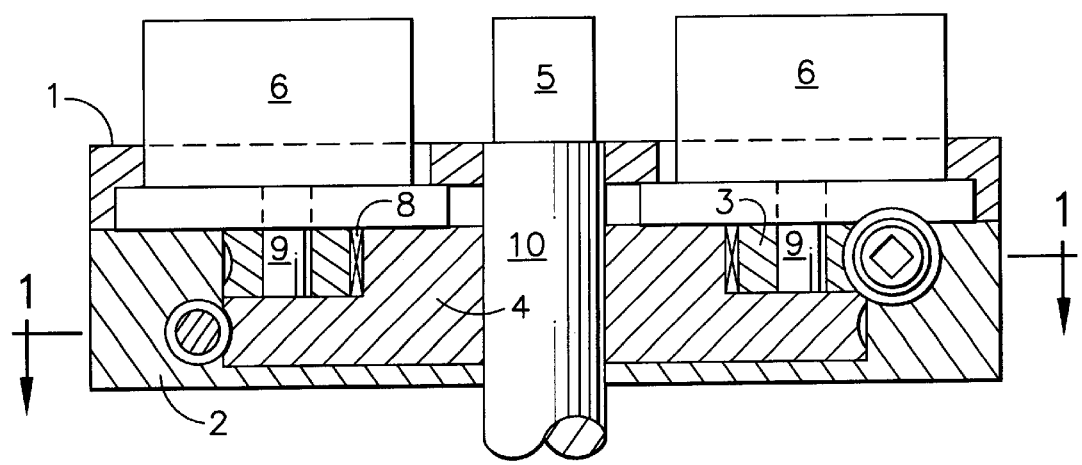
FIG. 2 is a cross sectional side view taken along line 2—2 of FIG. 1.
Figure 3:
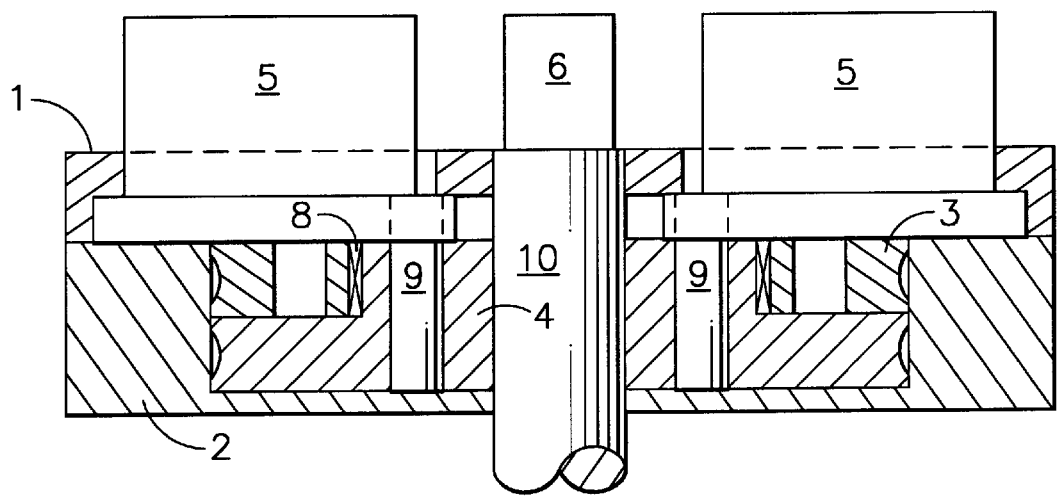
FIG. 3 is a cross sectional side view taken along line 3—3 of FIG. 1.

The entire disclosure of U.S. Pat. No. 5,158,487 is hereby incorporated by reference herein. With reference to FIGS. 1 and 2, a preferred embodiment of a chucking system of the present invention preferably includes: (1) face plate; (2) body; (3) top cam plate; (4) bottom cam plate; (5) first master jaw set; (6) second master jaw set; (7) worm shaft; (8) needle bearing; (9) pin; and (10) center pivot tube. A preferred embodiment of the chucking system will preferably selfcenter practically any workpiece no matter what shape. Size of the part to be held may depend on the size of the chucking system itself which can be scaled.

A preferred embodiment of the chucking system preferably works as follows: Body (2) preferably houses cam plates (3) and (4) which may be driven manually by an independent worm shaft (7), or hydraulically by a piston/gear rack in lieu of a worm shaft. Face plate (1) preferably houses four master jaws (5) and (6). The jaws may be engaged to the cam plates by pins (9). The jaws may be moved inward and outward preferably by rotation of the cam plates due to the ascending/descending slopes of the slots in the cam plates. Each set of two jaws (5) and (6) may be driven independently of the other because of the two separate cam plate mechanisms. The top cam plate is preferably held concentrically to the bottom cam plate by a needle bearing (8). The entire cam plate may "sandwich" pivot on center tube (10) which may be anchored in the base of the body and the top face plate.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A chucking system comprising:

a body;

a plurality of cam plates housed substantially within said body, said cam plates adapted to be manually driven, said cam plates defining slots; and a face plate housing four jaws, said jaws engaged to said cam plates by a plurality of pins;

wherein said jaws are adapted to be moved inward and outward by rotation of said cam plates; and wherein each set of two jaws is adapted to be driven independently of the other due to two separate cam plate mechanisms.

2. The chucking system of claim 1 wherein a top one of said cam plates is positioned substantially concentric to a bottom one of said cam plates by a needle bearing.

3. The chucking system of claim 1 wherein said cam plates pivot on a center tube which is secured to said body and said face plate.

* * * * *